United States Patent [19]

Fletcher et al.

[11] 4,033,503

[45] July 5, 1977

[54] METHOD FOR ATTACHING A FUSED-QUARTZ MIRROR TO A CONDUCTIVE METAL SUBSTRATE

[76] Inventors: James C. Fletcher, Administrator of the National Aeronautics and Space Administration, with respect to an invention of; George Sonnenschein, San Diego; Daniel McKeown, La Jolla, both of Calif.

[22] Filed: Aug. 27, 1976

[21] Appl. No.: 718,267

[52] U.S. Cl. .............................. 228/124; 228/263
[51] Int. Cl.² ............................................. B23K 1/02
[58] Field of Search .......... 228/121, 122, 123, 124, 228/263

[56] References Cited
UNITED STATES PATENTS

| | | | |
|---|---|---|---|
| 2,746,140 | 5/1956 | Belser | 228/263 X |
| 3,100,339 | 8/1963 | Bondley | 228/263 X |
| 3,111,741 | 11/1963 | Allen et al. | 228/122 X |

*Primary Examiner*—Al Lawrence Smith
*Assistant Examiner*—K. J. Ramsey
*Attorney, Agent, or Firm*—L. D. Wofford, Jr.; J. H. Beumer; John R. Manning

[57] ABSTRACT

A method for attaching a fused-quartz mirror to a conductive metal substrate which comprises the steps of tinning one surface of a fused-quartz mirror with a solder of substantially pure indium, tinning a metallic substrate with an indium eutectic alloy consisting essentially of indium, bismuth, lead and tin having a melting point substantially below that of indium, heating the eutectic alloy to a temperature substantially above its melting point, but below that of the solder, floating the mirror into place, and subsequently cooling the alloy to a temperature substantially below its melting point.

4 Claims, 2 Drawing Figures

METHOD FOR ATTACHING A FUSED-QUARTZ MIRROR TO A CONDUCTIVE METAL SUBSTRATE

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

1. Field of the Invention:

The invention generally relates to a method for attaching a fused-quartz mirror to a metal substrate, and more particularly to a method in which one surface of a fused-quartz mirror is coated with a film of solder, of a class including pure indium solder, and a metal substrate is tinned with a film of indium eutectic alloy, consisting essentially of indium, bismuth, lead and tin and subsequently united with the mirror at a solder/alloy interface.

2. Description of the Prior Art:

A major contaminant found aboard spacecraft is water vapor. Water vapor, of course, is present as a consequence of it having been absorbed in or deposited on substances and structures found aboard spacecraft, or as a result of operations of fuel cells frequently included in spacecraft systems.

As can be appreciated by those familiar with the spacecraft industry, precise determination of spatial distribution and density of water vapor in spacecraft systems and experiments is important to successful operation.

Water vapor often is monitored by cooling a quartz crystal microbalance (QCM) to temperatures below 140° K and observing its mass loading rate. In a fully equipped laboratory, cooling of a QCM readily can be accomplished cryogenically using liquid nitrogen or helium. However, it is generally accepted that radiative cooling is potentially the most practical technique for cooling a QCM in a spacecraft environment, because of the general unavailability of cryogenic fluids aboard such craft.

Radiant coolers usually include a second-surface, fused-quartz mirror bonded to a metal substrate. Unfortunately, the coefficient of thermal expansion of a metal substrate, such as one formed of aluminum, copper and the like, is from fifteen to twenty-five times that of fused quartz. As a consequence, separation of a mirror from its substrate may be expected to occur.

In an effort to overcome the propensity of mirrors to separate from their substrate, radiant coolers have been fabricated utilizing spectrally selected paints and adhesive coatings of metallized plastics in forming the reflective surfaces. Moreover, attempts have been made to bond the mirrors to the substrates utilizing silicone rubber adhesives. Unfortunately, those materials heretofore employed in attempting to avoid the consequences of the differentials of coefficients of expansion which in operation occurs between the substrate and the mirror, have poor outgassing characteristics and thus tend to introduce inaccuracies in the monitoring of water vapor.

Use of thin layers of gold applied to each non-wettable surface of a pair of surfaces to be joined has been proposed for overcoming the aforementioned difficulties. When employing layers of gold for this purpose the layers are positioned in face-to-face contact, and a length of indium wire is placed along one edge of the interface between the layers and heated in a vacuum. The indium is thus caused to flow along the interface between the layers. For example, see the method disclosed in United States Letters Pat. No. 3,857,161. The disadvantages of such a technique is also discussed in the aforementioned patent. For example, it is pointed out that gold applied to the non-wettable surfaces, to serve as a wetting agent for the indium, is highly soluble in indium. Thus, unless a sufficiently thick film of gold is applied to the surface, it may completely dissolve in the molting indium, resulting in a de-wetting of the surfaces and consequent failure of the seal. Additionally, the strength of the bond thus produced tends to be less than often is desired. Furthermore, it should be apparent that not only is the material utilized economically expensive, the technique is in itself rather complex.

Therefore, as can be appreciated, there currently exists a need for a practical method for bonding second-surface mirrors to radiant coolers which overcomes the aforementioned difficulties and disadvantages.

It is, therefore, the general purpose of the instant invention to provide a method for attaching a fused-quartz mirror to a conductive metal substrate and which has particular utility in the fabrication of radiatively-cooled QCM's for space application.

OBJECTS AND SUMMARY OF THE INVENTION

It is an object of the instant invention to provide a method for attaching a fused-quartz mirror to a metallic substrate.

It is another object to provide an improved method for attaching a fused-quartz mirror to a metallic substrate which overcomes the difficulties and disadvantages experienced as a consequence of the existing differentials in thermal expansion for a mirror and its substrate.

It is another object to provide a method for attaching a fused-quartz mirror to a conductive metal substrate which avoids the diffficulties and disadvantages previously experienced.

It is another object to provide a method in which a fused-quartz mirror is attached to a metallic substrate, although not necessarily limited in use thereto since the method can be employed equally as well when bonding ceramic meterials, such as silicone, to metallic substrates.

These and other objects and advantages are achieved through a method in which one surface of a fused-quartz mirror is tinned with a solder of pure indium, a planar surface of a metallic substrate is then tinned with an eutectic alloy having a melting point substantially below that of solder and consisting essentially of indium, bismuth, lead and tin; the alloy is thus heated to its melting temperature and the tinned surface of the fused-quartz mirror is floated into place and, thereafter, the resulting structure is permitted to cool.

DESCRIPTION OF PREFERRED EMBODIMENT

Figure 1:
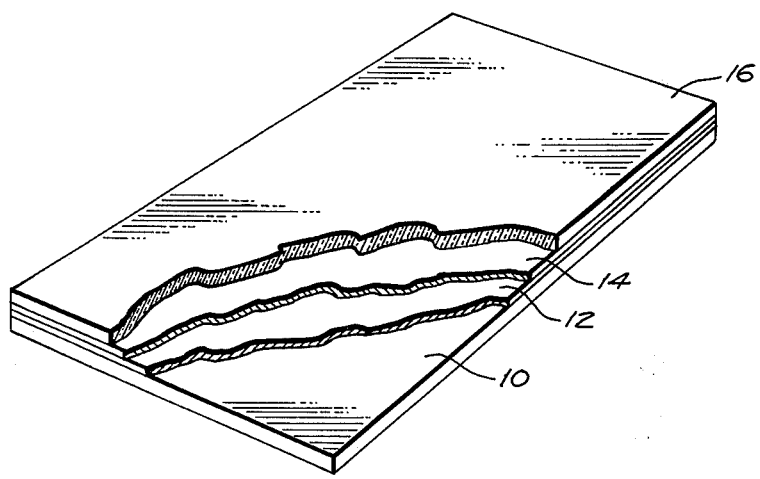
FIG. 1 is a perspective view illustrating a fused-quartz mirror mounted on a metal substrate.
Figure 2:
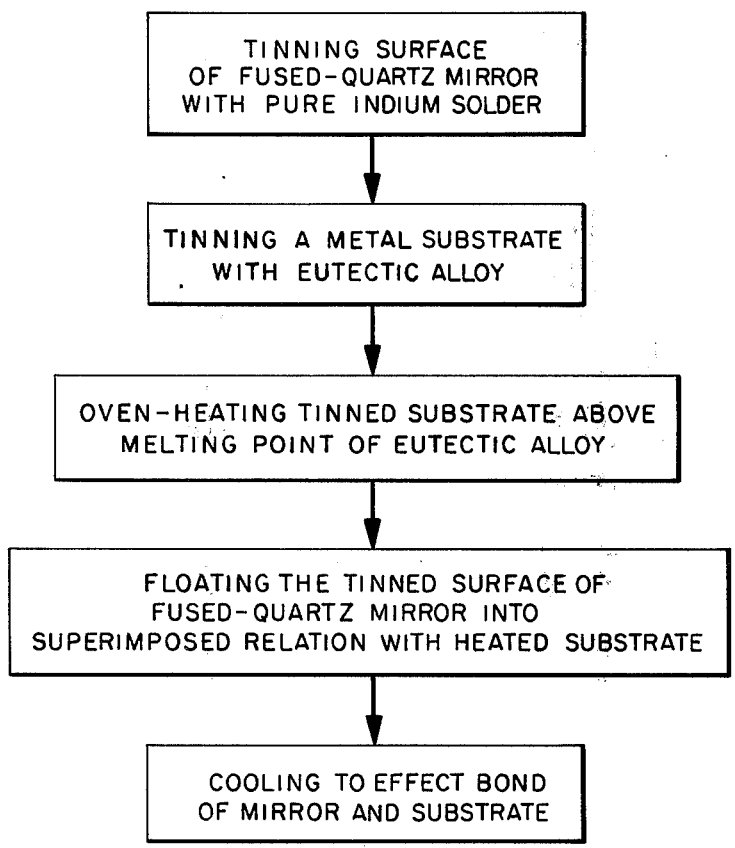
FIG. 2 is a flow diagram illustrating in sequence the steps of the method which embodies the principles of the instant invention.

As shown in the drawings, the substrate 10 has deposited thereon a thin film 12 of eutectic alloy. The substrate 10 is formed of a suitable conductive material, such as aluminum, copper and the like, while the film 12 comprises an eutectic quarternary alloy consisting essentially of indium, 20%; bismuth, 50%; lead, 18%, and tin, 12%, by weight, having a melting point of 58° C.

As shown in the drawings, a film 14 of pure indium solder having a melting point of 157° C is interposed between a surface of fused-quartz mirror, designated 16, and the film 12. Through the films 12 and 14, the mirror 16 is bonded to its substrate 10.

In order to deposit the films 12 and 14 between the mirror 16 and its substrate 10, one planar surface of the fused-quartz mirror 16 is tinned by depositing thereon the film 14 of pure indium solder of the film 14, utilizing a suitable tinning technique well understood by those familiar with the art of joining adjacent surfaces of ceramics and metal. Briefly, however, it is sufficient to understand that to achieve tinning, the plan surface of the mirror 16 is wetted by applying thereto the pure indium in its molten state.

Subsequent to the tinning of the mirror 16, the metal substrate 10 is tinned with the eutectic alloy of the film 12, and then permitted to cool. The tinning of the substrate 10, also, is effected in a manner well known, similar to that aforementioned.

The next step requires that the temperature of the alloy of the film 12 be raised sufficiently for causing it to again attain a molten condition. This, where desired, is achieved simply by placing the tinned substrate in an oven and raising the temperature thereof to 75° C. Where desired, a lip, not shown, is extended along the peripheral portions of the substrate 10 for purposes of assuring that in cooperation with the effects of surface tension of the alloy in its molten state the alloy remains in place on the surface of the substrate. The tinned surface the mirror 16 is now deposited on the upper surface of the molten alloy and floated into place.

Where desired, slight vibratory motion may be imparted to the mirror, through a gentle tapping thereof, for purposes of assuring that all irregularities of the surfaces of the mirror 16 and its substrate 10 are completely filled with the eutectic alloy. Subsequently, the temperature of the alloy is slowly reduced to ambient temperature. Of course, the film of indium 14 and the film of solder 12 achieve a bonded condition with the mirror 16 and substrate 10, respectively, as well as with each other, for thus effecting a bonding of the mirror to its substrate.

It has been found through testing that excellent adhesion between the mirror and substrate thus is achieved. For example, in testing the adhesion of a mirror 16 to its substrate 10, the mirror and indium solder separated at the quartz/solder interface before fracturing of the solder occurred. Moreover, temperature cycling of the soldered mirror, between 300° K and 100° K, resulted in no apparent deterioration of the bond existing between the fused-quartz mirror 16 and its substrate 10.

In operation, even though the thermal expansion coefficient of the substrate is from fifteen to twenty-five times greater than that of the fused-quartz mirror, fracture which normally would be experienced, because of the differential in expansion coefficients, is avoided simply because of the ductility of the film of indium through which temperature-induced thermal stress is absorbed. Thus the large sheer stresses which occur in a space environment due to the severity of the tempertures operationally encountered are absorbed.

In view of the foregoing, it should be apparent that the low melting temperatures of solders of the tin-indium family permit a successful bonding of second-surface fused-quartz mirrors to metal substrates. Moreover, self-contamination due to outgassing by organic cements and the like is thus eliminated, and since thermal conductivity of the indium solders is several orders of magnitude greater than organic cements lower radiant cooling operating temperatures can be provided for. Thus the method of the instant invention has particular utility in fabricating radiant coolers for use aboard operational spacecraft.

Finally, it is contemplated that while the method of the instant invention is particularly useful in the fabrication of radiant coolers, utility also can be found in bonding solar cells to panel substrates because of the elimination of inherent problems resulting from outgassing. Furthermore, increased conversion of efficiency resulting from a minimizing of the thermal resistance between the cell and the substrate can be expected to occur.

We claim:

1. A method for attaching a fused-quartz mirror to a conductive metal substrate comprising the steps of:
   A. tinning one substantially planar surface of a fused-quartz mirror with a solder of a class including pure indium solder;
   B. tinning a metal substrate with an indium eutectic alloy consisting essentially of indium, bismuth, lead and tin, having a melting point substantially below that of the solder;
   C. heating the alloy to a temperature substantially above its melting point, but below that of the solder;
   D. establishing a contiguous relationship between the tinned surface of the mirror and a surface of the alloy while maintaining the temperature of the alloy substantially above the melting point of the alloy; and
   E. cooling the alloy to a temperature substantially below its melting point while maintaining the established contiguous relationship between the surfaces of the mirror and the alloy.

2. The method of claim 1 wherein said eutectic alloy consists essentially of twenty parts by weight indium, fifty parts by weight bismuth, eighteen parts by weight lead, and twelve parts by weight tin.

3. The method of claim 1 further comprising the step of vibrating the mirror prior to cooling the alloy while the contiguous relation between the alloy and the tinned surface is maintained.

4. The method of claim 1 wherein said metallic substrate includes an endless peripheral lip.

* * * * *